(12) United States Patent
Zhai et al.

(10) Patent No.: US 10,791,032 B2
(45) Date of Patent: Sep. 29, 2020

(54) METHOD AND APPARATUS FOR DETERMINING A PHYSICAL POSITION OF A DEVICE

(71) Applicant: EMC Corporation, Hopkinton, MA (US)

(72) Inventors: Haifang Zhai, Shanghai (CN); Jing Chen, Shanghai (CN); Peter Yuanhang Pan, Shanghai (CN); Ted Huaqi Chen, Shanghai (CN); Sandburg Hao Hu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 15/269,115

(22) Filed: Sep. 19, 2016

(65) Prior Publication Data
US 2017/0085432 A1     Mar. 23, 2017

(30) Foreign Application Priority Data

Sep. 23, 2015 (CN) .......................... 2015 1 0614231

(51) Int. Cl.
*G06F 15/173* (2006.01)
*H04L 12/24* (2006.01)
*H04L 12/931* (2013.01)

(52) U.S. Cl.
CPC .............. *H04L 41/12* (2013.01); *H04L 49/40* (2013.01); *Y04S 40/164* (2013.01)

(58) Field of Classification Search
CPC ................... H04L 41/12; H04L 49/40

USPC ........................................................ 709/223
See application file for complete search history.

(56) References Cited

U.S. PATENT DOCUMENTS 3,922,492 A * 11/1975 Lumsden ............. H04M 11/002
                                                                   379/106.07
7,260,650 B1 * 8/2007 Lueckenhoff .......... H04L 69/16
                                                                 709/246
2004/0039821 A1    2/2004 Giglio et al.
(Continued)

FOREIGN PATENT DOCUMENTS

| CN | 101622801 | 1/2010 |
| CN | 101690003 | 3/2010 |
| CN | 104820653 | 8/2015 |

*Primary Examiner* — Aftab N. Khan
*Assistant Examiner* — Anh Nguyen
(74) *Attorney, Agent, or Firm* — BainwoodHuang

(57) ABSTRACT

Embodiments of the present disclosure provide a method and apparatus for determining a physical position of a device. The method comprises: transmitting a control command to the device, the command instructing the device to change power loading of the device in a predetermined pattern; receiving, from a power distribution unit providing power supply for the device, a network address of the power distribution unit, the network address being transmitted by the power distribution unit in response to detecting the change of the power loading in the predetermined pattern; and determining the physical position of the device based at least on the network address of the power distribution unit. With the technical solution according to the embodiments of the present disclosure, the position of the device can be automatically determined without any manual intervention, which helps to control the operation cost and improve the maintenance efficiency.

20 Claims, 11 Drawing Sheets

(56) References Cited

U.S. PATENT DOCUMENTS

| | | | |
|---|---|---|---|
| 2008/0317021 A1* | 12/2008 | Ives | H04L 12/10 370/389 |
| 2011/0022862 A1* | 1/2011 | Nagao | G06F 1/266 713/310 |
| 2013/0246816 A1 | 9/2013 | Hsieh et al. | |
| 2017/0085079 A1* | 3/2017 | Yamane | H02M 1/14 |
| 2017/0097671 A1* | 4/2017 | Hutchison | G06F 1/3287 |

* cited by examiner

METHOD AND APPARATUS FOR DETERMINING A PHYSICAL POSITION OF A DEVICE

RELATED APPLICATION

This application claim priority from Chinese Patent Application Number CN201510614231.6, filed on Sep. 23, 2015 at the State Intellectual Property Office, China, titled "METHOD AND APPARATUS FOR DETERMINING A PHYSICAL LOCATION OF A DEVICE," the contents of which is herein incorporated by reference in its entirety.

FIELD OF THE DISCLOSURE

Embodiments of the present disclosure generally relate to device locating, and more particularly, to a method and apparatus for determining a physical position of a device.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

To solve the foregoing problems, embodiments of the present disclosure propose a technical solution for locating a device in which power loading of the device to be located is manipulated so that the power loading is changed in a predetermined pattern and the device is located based on detection of the predetermined pattern.

In a first aspect of the present disclosure, there is provided a method executed at a management device to determine a physical position of a device. The method comprises: transmitting a control command to the device instructing the device to change power loading of the device in a predetermined pattern; receiving, from a power distribution unit providing power supply for the device, a network address of the power distribution unit, the network address being transmitted by the power distribution unit in response to detecting the power loading being changed in the predetermined pattern; and determining the physical position of the device based at least on the network address of the power distribution unit.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limitation. In the accompanying drawings.

DETAILED DESCRIPTION

Figure 1:
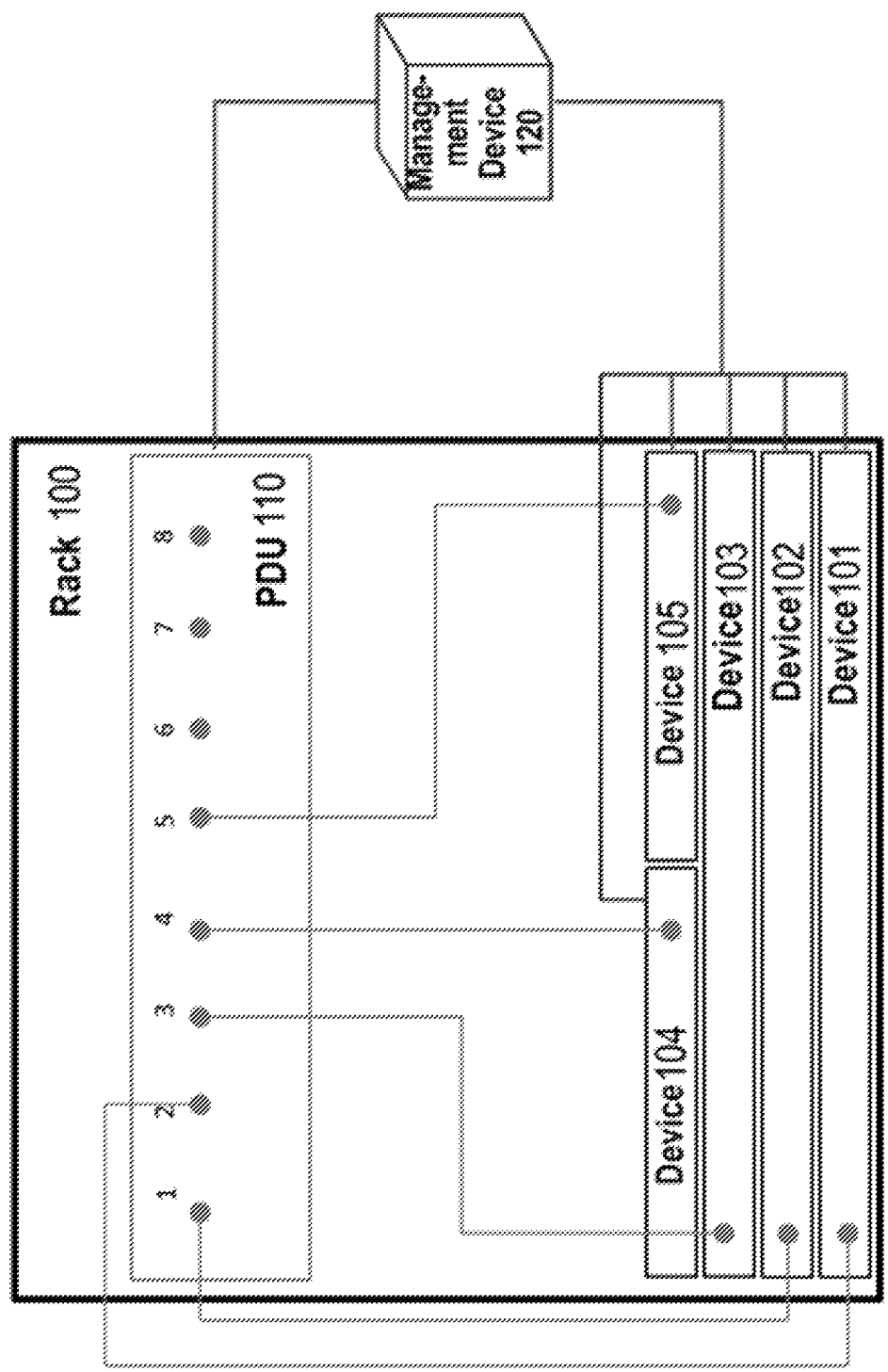
FIG. 1 shows a block diagram of an environment in which the embodiments of the present disclosure may be implemented.

Principles of the present disclosure are described below by means of several exemplary embodiments as shown in the accompanying drawings. It should be understood that these embodiments are described only for enabling those skilled in the art to better understand and further implement the present disclosure, rather for limiting the scope of the present disclosure in any manner.

Typically, in a data center or a large lab, as a number of devices increases, tracking physical positions of the devices (such as a server, a disk array, and the like.) is of vital importance to system maintenance, hardware configuration change, hardware trouble shooting, application migration, and so on. Generally, information on the physical positions of the devices can be used for achieving effective data center management, power saving strategy and resource allocation.

Conventionally, former approaches for determining a physical position of a device include tracking the physical position of the device by the Internet Protocol (IP) address of the device. Typically, the IP address is used for tracking which device the software or applications are running on. Moreover, the IP address is straightforward to lab operators. That is, a fixed IP address and the position of the device are bound together by maintaining offline records. However, Traditionally, this method has the following disadvantages: it is hard to track the physical device corresponding to the IP address because the dynamic host configuration protocol (DHCP) introduces dynamic IP assignment; if the fixed IP address is used for different positions, the device is prevented from migration. In addition, generally, the IP address cannot be used for distinguishing devices in the same rack, and the positions of the devices in the same rack (i.e., units in the rack) usually have to be determined by manual plug-and-try.

Traditionally, former approaches for determining a physical position of a device further include inventory scan. Typically, in this method, a bar code of a serial number (S/N) of a device and a local tag that indicates coarse site information will be scanned and saved in a database. However, generally, this method has the following disadvantages: a precise position of the device cannot be obtained, the device is not aware of its own position, and operators or users usually use an IP address instead of the S/N.

To solve the foregoing problems, embodiments of the present disclosure propose a technical solution for locating a device in which power loading of the device to be located is manipulated so that the power loading is changed in a predetermined pattern and the device is located based on detection of the predetermined pattern.

In a first aspect of the present disclosure, there is provided a method executed at a management device to determine a physical position of a device. The method comprises: transmitting a control command to the device instructing the device to change power loading of the device in a predetermined pattern; receiving, from a power distribution unit providing power supply for the device, a network address of the power distribution unit, the network address being transmitted by the power distribution unit in response to detecting the power loading being changed in the predetermined pattern; and determining the physical position of the device based at least on the network address of the power distribution unit.

In some embodiments, the control command includes a binary coding sequence indicating the predetermined pattern.

In some embodiments, a digit "0" in the binary coding sequence indicates the device to be in a first loading state in a predetermined time interval, and a digit "1" in the binary coding sequence indicates the device to be in a second loading state that is different from the first loading state in the predetermined time interval.

In some embodiments, the binary coding sequence is generated by encoding the network address of the device or an identifier specific to the device.

In some embodiments, determining the physical position of the device comprises: determining a physical position of the power distribution unit based on mapping between the network address of the power distribution unit and the physical position of the power distribution unit; and determining the physical position of the power distribution unit as the physical position of the device.

In some embodiments, receiving the network address of the power distribution unit comprises receiving the network address of the power distribution unit and a serial number of a power port of the power distribution unit that provides power supply for the device; and determining the physical position of the device comprises determining the physical position of the device based on the network address of the power distribution unit and the serial number of the power port.

In a second aspect of the present disclosure, there is provided a method executed, at a device to be located, to determine a physical position of a device. The method comprises: receiving, at the device, a control command instructing the device to change power loading of the device in a predetermined pattern; and changing, based on the control command, the power loading of the device in the predetermined pattern so that the physical position of the device is determined by detecting the predetermined pattern.

In some embodiments, the control command includes a binary coding sequence, wherein a digit "0" in the binary coding sequence indicates the device to be in a first loading state in a predetermined time interval, and a digit "1" in the binary coding sequence indicates the device to be in a second loading state that is different from the first loading state in the predetermined time interval.

According to a third aspect of the embodiments of the present disclosure, there is provided a method executed at a power distribution unit providing power supply for a device to determine a physical position of the device. The method comprises: detecting power loading of the device at a power distribution unit that provides power supply for the device; and in response to detecting the power loading of the device being changed in a predetermined pattern, transmitting a network address of the power distribution unit to a management device so that the management device determines the physical position of the device based at least on the network address.

In some embodiments, detecting the power loading of the device comprises: sampling the power loading of the device to obtain sampled data; and decoding the sampled data to obtain a binary sequence, wherein a digit "0" in the binary sequence indicates the device to be in a first loading state in a predetermined time interval, and a digit "1" in the binary sequence indicates the device to be in a second loading state that is different from the first loading state in the predetermined time interval.

In some embodiments, transmitting the network address of the power distribution unit to the management device comprises: transmitting the network address of the power distribution unit and a serial number of a power port of the power distribution unit that provides power supply for the device so that the management device determines the physical position of the device based on the network address of the power distribution unit and the serial number of the power port.

According to a fourth aspect of the embodiments of the present disclosure, there is provided an apparatus implemented at a management device to determine a physical position of a device. The apparatus comprises: a transmitting unit configured to transmit a control command to the device instructing the device to change power loading of the device in a predetermined pattern; a receiving unit configured to receive, from a power distribution unit providing power supply for the device, a network address of the power distribution unit, the network address being transmitted by the power distribution unit in response to detecting the power loading being changed in the predetermined pattern; and a determining unit configured to determine the physical position of the device based at least on the network address of the power distribution unit.

In some embodiments, the control command includes a binary coding sequence indicating the predetermined pattern.

In some embodiments, a digit "0" in the binary coding sequence indicates the device to be in a first loading state in a predetermined time interval, and a digit "1" in the binary coding sequence indicates the device to be in a second loading state that is different from the first loading state in the predetermined time interval.

In some embodiments, the determining unit is further configured to: determine a physical position of the power distribution unit based on mapping between the network address of the power distribution unit and the physical position of the power distribution unit; and determine the physical position of the power distribution unit as the physical position of the device.

In some embodiments, the receiving unit is further configured to receive the network address of the power distribution unit and a serial number of a power port of the power distribution unit that provides power supply for the device; and wherein the determining unit is further configured to determine the physical position of the device based on the network address of the power distribution unit and the serial number of the power port.

In a fifth aspect of the present disclosure, there is provided an apparatus implemented at a to-be-located device to determine a physical position of a device. The apparatus comprises: a receiving unit configured to receive, at the device, a control command instructing the device to change power loading of the device in a predetermined pattern; and a control unit configured to change, based on the control command, the power loading of the device in the predetermined pattern so that the physical position of the device is determined by detecting the predetermined pattern.

In a sixth aspect of the present disclosure, there is provided an apparatus implemented at a power distribution unit providing power supply for a device to determine a physical position of the device. The apparatus comprises: a detecting unit configured to detect power loading of the device at a power distribution unit that provides power supply for the device; and a transmitting unit configured to transmit, in response to detecting the power loading of the device being changed in a predetermined pattern, a network address of the power distribution unit to a management device so that the management device determines the physical position of the device based at least on the network address.

In some embodiments, the apparatus further comprises: a sampling unit configured to sample the power loading of the device to obtain sampled data; and a decoding unit configured to decode the sampled data to obtain a binary sequence, wherein a digit "0" in the binary sequence indicates the device to be in a first loading state in a predetermined time interval, and a digit "1" in the binary sequence indicates the device to be in a second loading state that is different from the first loading state in the predetermined time interval.

In some embodiments, the transmitting unit is further configured to transmit the network address of the power distribution unit and a serial number of a power port of the power distribution unit which provides power supply for the device so that the management device determines the physical position of the device based on the network address of the power distribution unit and the serial number of the power port.

The technical solution according to the embodiments of the present disclosure may be implemented when the device is initially deployed in the rack. Therefore, no effect will be exerted on normal operation of the device as well as normal operation of other devices after deployment. In addition, with the technical solution according to the embodiments of the present disclosure, the position of the device can be automatically determined without any manual intervention, which helps to control the operation cost and improve the maintenance efficiency. Moreover, the technical solution according to the embodiments of the present disclosure introduces little modification to devices in an existing data center and is thus prone to backward compatibility, which is significant to the management of capital expenditures.

FIG. 1 shows a block diagram of an environment in which the embodiments of the present disclosure may be implemented. As shown in FIG. 1, devices 101, 102, 103, 104 and 105 are deployed on a rack 100. Each of the devices 101, 102, 103, 104 and 105 includes, but are not limited to, a server, a disk array, and the like. In addition, a power distribution unit (PDU) 110 is deployed on the rack 100. PDU 110 comprises power ports 1, 2, 3, 4, 5, 6, 7 and 8, and provides power supply for devices 101 to 105 through power ports 1 to 5 and corresponding power lines.

A management device 120 communicates with the devices 101 to 105 and PDU 110 so as to manage and control them. Communications between the management device 120 and the devices 101 to 105 and communications between the management device 120 and the PDU 110 may be implemented under any appropriate communication protocol, including but being not limited to, the Intelligent Platform Management Interface (IPMI) protocol, the Inter Integrated Circuit ($I^2C$) protocol and/or any other protocol that is currently known or to be developed later. The management device 120 includes, but is not limited to, a server.

It should be understood that for the illustration purpose, FIG. 1 shows one PDU 110 and five devices 101 to 105 deployed in the rack 100. However, any appropriate number of PDUs and devices may be deployed on the rack 100 according to a specific application scenario.

As described above, in a data center or a large lab, as the number of the devices increases, tracking physical positions of the devices (such as a server, a disk array, etc.) is of vital importance to system maintenance, hardware configuration change, hardware trouble shooting, application migration, and so on. In practice, when a certain device has a failure or its configuration needs to be changed, operators or users may obtain the device's network address, such as an IP address. However, based only on the device's IP address, sometimes it is hard to determine the device's physical position. For example, it is hard to determine which data center or which rack of the data center the device is located in. To this end, the embodiments of the present disclosure provide a method for locating a device in which power loading of the device to be located is manipulated so that the power loading is changed in a predetermined pattern and the device is located based on detection of the predetermined pattern.

Figure 2:
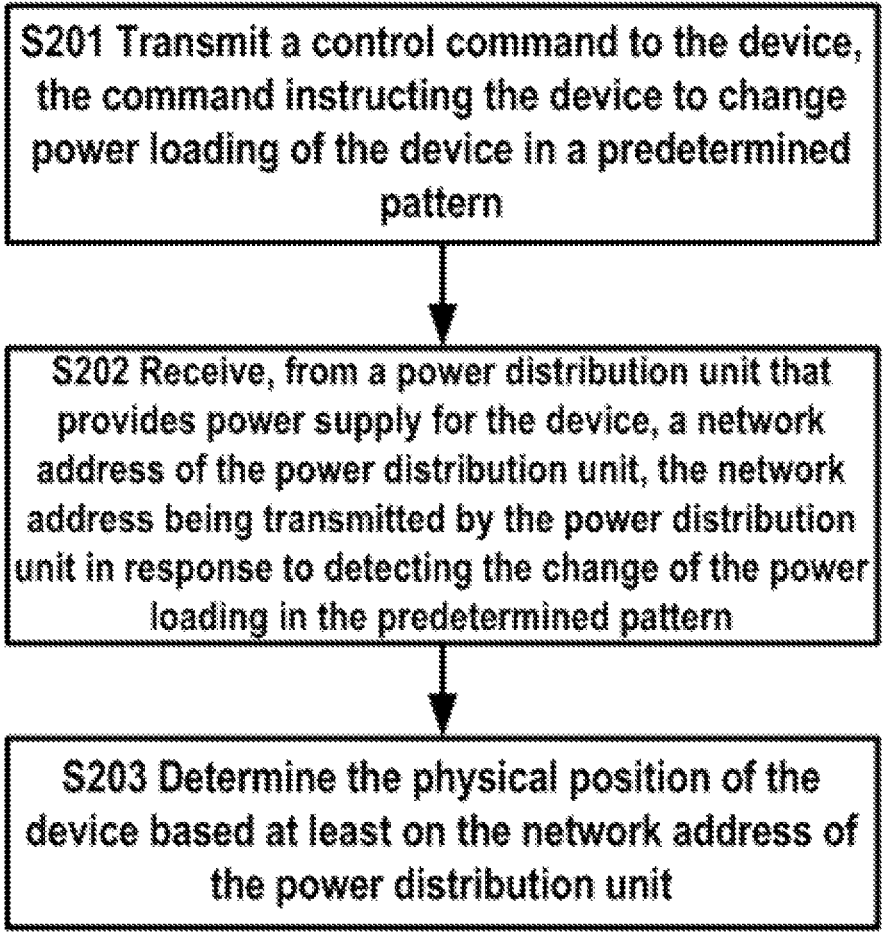
FIG. 2 shows a flowchart of a method, executed at a management device, for determining a physical position of device according to a first aspect of the embodiments of the present disclosure.

FIG. 2 shows a flowchart of a method 200 executed at a management device to determine a physical position of a device according to a first aspect of the embodiments of the present disclosure. In some embodiments, the method 200 is executed by the management device 120 shown in FIG. 1. However, it should be understood that the method 200 may be executed by other appropriate device. The scope of the present disclosure is not limited in this regard.

Figure 3:
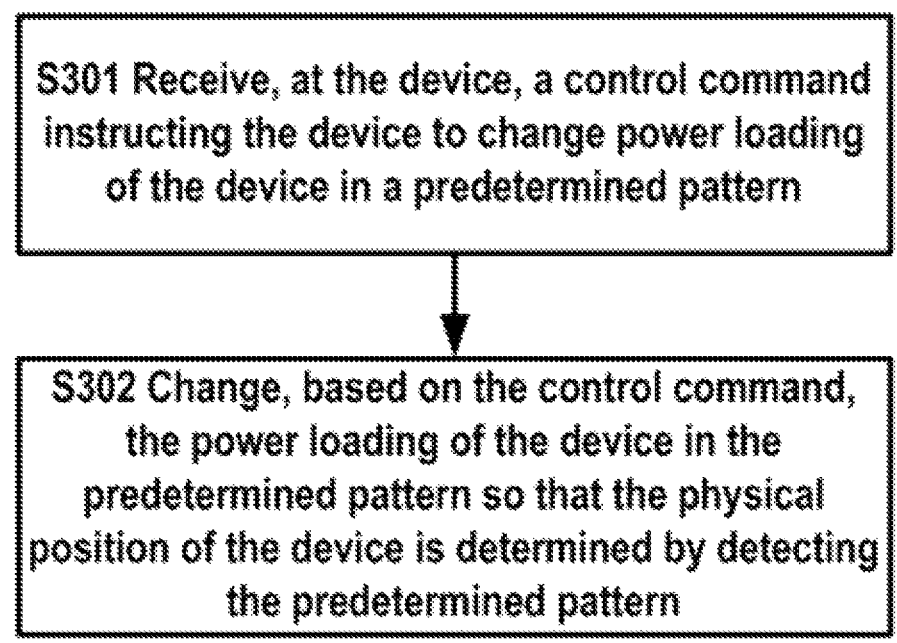
FIG. 3 shows a flowchart of a method, executed at a to-be-located device, for determining a physical position of a device according to a second aspect of the embodiments of the present disclosure.

FIG. 3 shows a flowchart of a method 300 executed at a device to be located to determine a physical position of a device according to a second aspect of the embodiments of the present disclosure. In some embodiments, the method 300 is executed by any one of devices 101 to 105 shown in FIG. 1.

Figure 4:
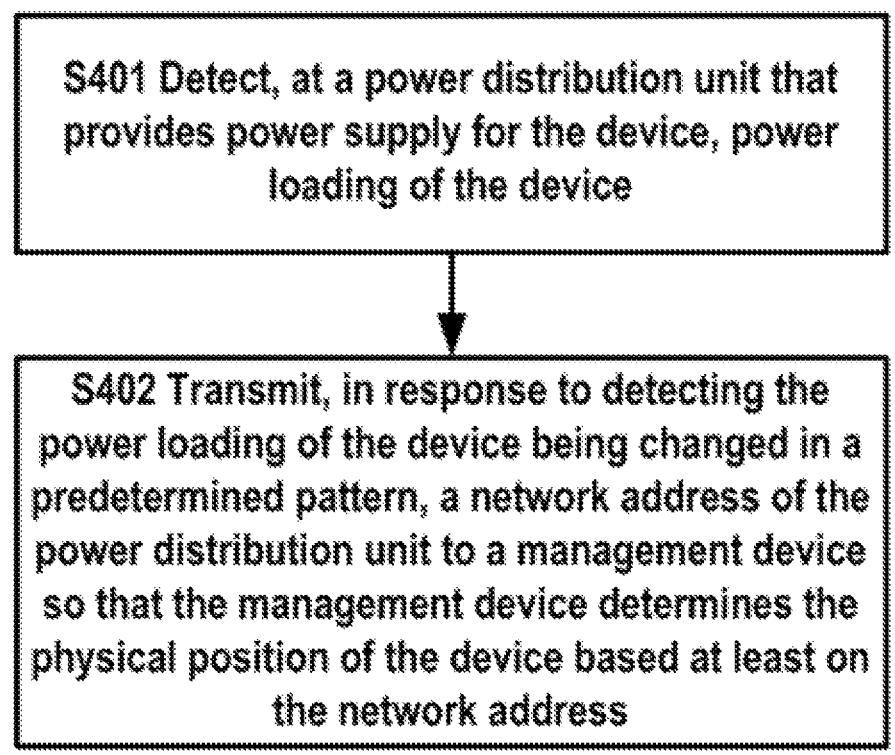
FIG. 4 shows a flowchart of a method, executed at a power distribution unit, for determining a physical position of a device according to a third aspect of the embodiments of the present disclosure.

FIG. 4 shows a flowchart of a method 400 executed by a power distribution unit to determine a physical position of a device according to a third aspect of the embodiments of the present disclosure. In some embodiments, the method 400 is executed by the power distribution unit 110 shown in FIG. 1. In some embodiments, the power distribution unit 110 includes a smart power distribution unit with monitoring and communication capability.

First, with reference to FIG. 2, in step S201, the management device 120 transmits a control command to any one of devices 101 to 105 (e.g., the device 101), the control command instructing the device 101 to change power loading of the device 101 in a predetermined pattern.

In some embodiments, the management device 120 may further communicate with a DHCP server (not shown) to obtain a network address of the power distribution unit 110 and a network address of each of devices 101 to 105. In some embodiments, the power distribution unit 110 and devices 101 to 105 are deployed in a data center, and the device 101 is a server in the data center. In this case, the network address of the power distribution unit 110 includes an IP address of the power distribution unit 110, and the network address of the device 101 includes an IP address of a baseboard management controller (BMC) of the device 101. After obtaining the IP address of the BMC of the device 101, the management device 120 may transmit the control command to the device 101 by using this IP address.

In some embodiments, the control command includes an IPMI command.

In some embodiments, the control command includes a binary coding sequence indicating the predetermined pattern. A digit "0" in the binary coding sequence indicates the device 101 to be in a first loading state in a predetermined time interval, and a digit "1" in the binary coding sequence indicates the device 101 to be in a second loading state that is different from the first loading state in the predetermined time interval. In some embodiments, a digit "1" in the binary coding sequence indicates the device 101 to be in a first loading state in a predetermined time interval, and a digit "0" in the binary coding sequence indicates the device 101 to be in a second loading state that is different from the first loading state in the predetermined time interval.

In some embodiments, the first loading state is a sleep state, and the second loading state is a boot-up state. The predetermined time interval may be any appropriate value, e.g., 10 seconds.

In some embodiments, in the first loading state the device 101 does not change its power loading in the predetermined time interval, and in the second loading state the device 101 turns a speed of its fan to a maximum speed, thereby increasing the loading significantly.

In some embodiments, in the first loading state the device 101 does not change its power loading in the predetermined time interval, and in the second loading state the device 101 margins an output voltage of one power supply unit (PSU) high or low by a predetermined value (e.g., 5%) while keeping an output voltage of the other PSU unchanged.

In some embodiments, in the first loading state the device 101 does not change its power loading in the predetermined time interval, and in the second loading state the device 101 margins a voltage of its motherboard high by a predetermined value (e.g., 5%).

In some embodiments, the binary coding sequence is generated by encoding the IP address of the BMC of the device 101 or an identifier (e.g., a serial number) specific to the device 101. It may be understood that any appropriate encoding technique may be used for encoding the IP address of the BMC of the device 101 or the identifier specific to the device 101 to generate the binary coding sequence. For example, a hash computation may be performed on the IP address of the BMC of the device 101 or the identifier, and then a result of the hash computation may be error-correction coded to generate the binary coding sequence. The objective of error-correction coding the result of the hash computation is to overcome interference so as to accurately transmit the result of the hash computation. Error-correction coding schemes include, but are not limited to, BCH coding, Hamming coding.

Now turn to FIG. 3, in step S301, a control command is received at the device 101 and the control command instructs the device 101 to change power loading of the device 101 in a predetermined pattern. Subsequently, in step S302, based on the control command, the device 101 changes its power loading in the predetermined pattern so that a physical position of the device 101 is determined by detecting the predetermined pattern.

In some embodiments, the control command is received at the BMC of the device 101. Generally, hardware of the device 101, such as CPU, memory, hard disk, motherboard, fans and so on, is electrically connected with the device's BMC and PSU as power loading, and the PSU is electrically connected with a corresponding power port of the power distribution unit 110. The BMC of the device 101 may change, based on the control command, loading of the hardware that is electrically connected with BMC in the predetermined pattern, and further cause output current of PSU that is electrically connected with the hardware to change in the predetermined pattern. Thereby, the physical position of the device 101 is determined by detecting the predetermined pattern at the corresponding power port of the power distribution unit 110 which is electrically connected with the PSU.

As described above, In some embodiments, the control command includes a binary coding sequence, wherein the digit "0" in the binary coding sequence indicates the device 101 to be in a first loading state in a predetermined time interval, and the digit "1" in the binary coding sequence indicates the device 101 to be in a second loading state that is different from the first loading state in the predetermined time interval.

Figure 5:
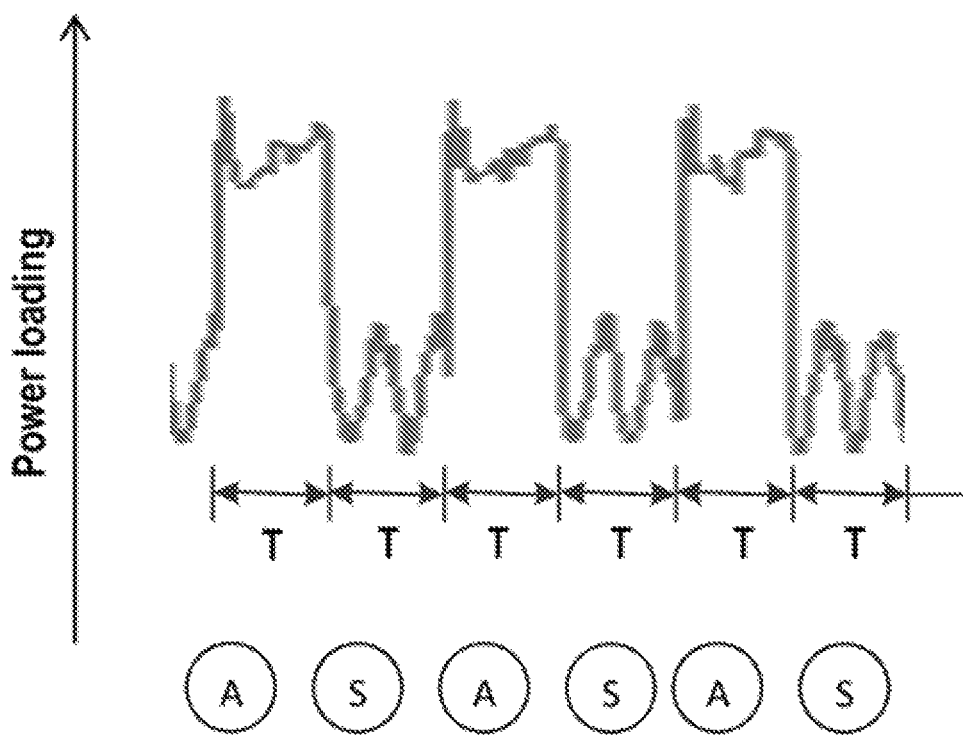
FIG. 5 schematically shows power loading that changes in a predetermined pattern on a power line between the device and a corresponding power port.

In addition, as described above, in some embodiments, the digit "0" in the binary coding sequence indicates the device 101 to be in a sleep state in a predetermined time interval, and the digit "1" in the binary coding sequence indicates the device 101 to be in a boot-up state in the predetermined time interval. For example, the binary coding sequence may be 101010. Accordingly, FIG. 5 schematically shows power loading that is changed in the predetermined pattern (i.e., "101010") on a power line between the device 101 and a corresponding power port 1. In FIG. 5, corresponding to the first bit "1" in the binary coding sequence 101010, the device 101 enters into a boot-up state A in the first time interval T; next, corresponding to the second bit "0" in the binary coding sequence 101010, the device 101 returns to a sleep state S in the second time interval T, and so on, till the last bit in the binary coding sequence 101010.

It should be understood that for the illustration purpose only, FIG. 5 shows the power loading that is changed in a square wave pattern. However, based on the received binary coding sequence, the device's power loading may be changed in any appropriate pattern. The scope of the present disclosure is not limited in this regard.

Now turn to FIG. 4, in step S401, the power distribution unit 110 detects the power loading of the device 101. As described above, the power distribution unit 110 provides supply power for the device 101 through the power port 1 and a corresponding power line. Therefore, the power distribution unit 110 may detect the power loading of the device 101 at the power port 1.

Next in step S402, in response to detecting the power loading of the device 101 is changed in the predetermined pattern, the power distribution unit 110 transmits a network address of the power distribution unit 110 to the management device 120 so that the management device 120 can determine a physical position of the device 101 based at least on the network address.

Accordingly, in step S202 of FIG. 2, the management device 120 receives from the power distribution unit 110 the network address of the power distribution unit 110. Then, in step S203 of FIG. 2, the management device 120 determines a physical position of the device 101 based at least on the network address of the power distribution unit 110.

It may be understood that the management device 120 may communicate with a cloud database (not shown) at the data center to obtain mapping between the network address of the power distribution unit 110 and the physical position of the power distribution unit 110. In some embodiments, the physical position of the power distribution unit 110 may be identified by its position identifier, and its position identifier may include a multi-level description of the physical position. As one example, the position identifier of the physical position of the power distribution unit 110 may include names of the city and the building where the power distribution unit 110 is located, and numbers of the floor, the room and the rack where the power distribution unit 110 is located. For example, the position identifier of the physical position of the power distribution unit 110 may be "Hop-171-B2-F3-Lab4-Rack5", wherein "Hop-171" represents the name of the city where the power distribution unit 110 is located (i.e., Hopkinton), "B2" represents the building name (i.e., building #2), "F3" represents the floor (i.e., floor #3), "Lab4" represents the particular room (i.e., lab room #4), and "Rack5" represents the rack number (i.e., rack #5). Thus, based on the mapping between the network address of the power distribution unit 110 and the position identifier of the physical position of the power distribution unit 110, the management device 120 may determine the physical position of the power distribution unit 110 that provides power supply for the device 101, and further determine the physical position of the power distribution unit 110 as the physical position of the device 101. For example, in the above example in which the position identifier of the physical position of the power distribution unit 110 is used, it may be determined that the device 101 is located in rack #5, lab room #4, floor #3, building #2 of the city Hopkinton.

In some embodiments, the power distribution unit 110 detecting the power loading of the device 101 comprises: sampling the power loading of the device 101 in a predetermined cycle to obtain sampled data and decoding the sampled data to obtain a binary sequence, wherein a digit "0" in the binary sequence indicates the device 101 to be in a first loading state in a predetermined time interval, and a digit "1" in the binary sequence indicates the device 101 to be in a second loading state that is different from the first loading state in the predetermined time interval.

Figure 6:
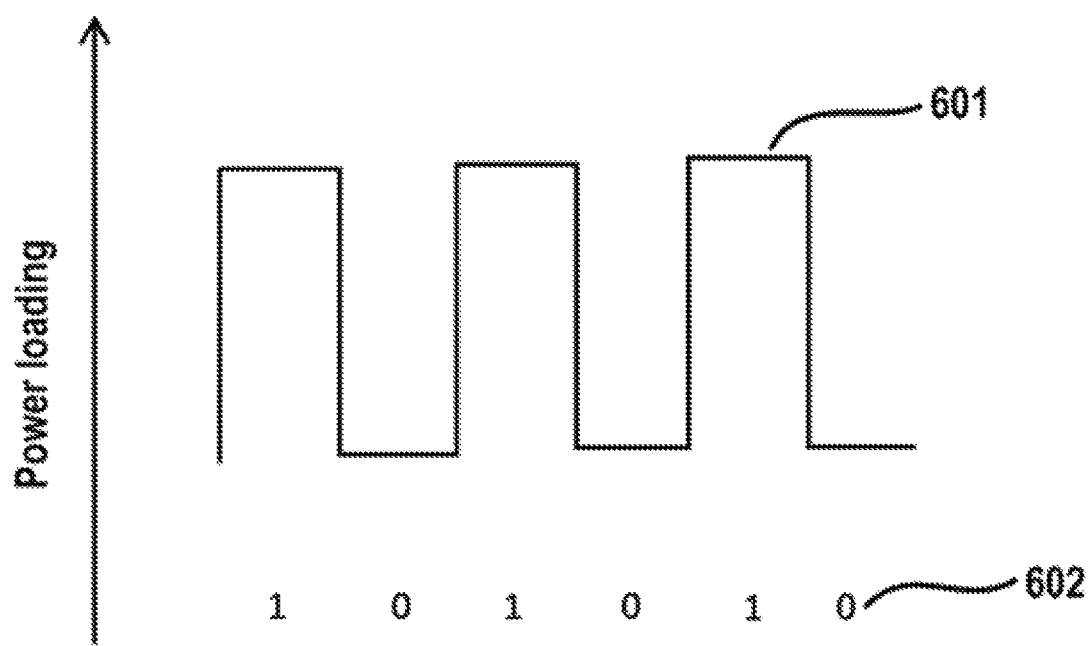
FIG. 6 schematically shows sampled data obtained at a corresponding power port when the device changes power loading in the predetermined pattern as shown in FIG. 5, as well as a binary sequence obtained by decoding the sampled data.

FIG. 6 schematically shows sampled data 601 obtained at the power port 1 when the device 101 changes the power loading in a predetermined pattern (i.e., "101010") as shown in FIG. 5, as well as a binary sequence 602 obtained by decoding sampled data 601. As seen from FIG. 6, the binary sequence 602 obtained at the power distribution unit 110 is the binary sequence 101010 that is sent to the device 101 from the management device 120. Where the binary coding sequence is generated by encoding the IP address of BMC of the device 101, the power distribution unit 110 can obtain the IP address of BMC of the device 101 based on the binary sequence 602. Therefore, besides transmitting the IP address of the power distribution unit 110 to the management device 120, the power distribution unit 110 may further transmit to the management device 120 the IP address of BMC of the device 101 that results from decoding.

Figure 7:
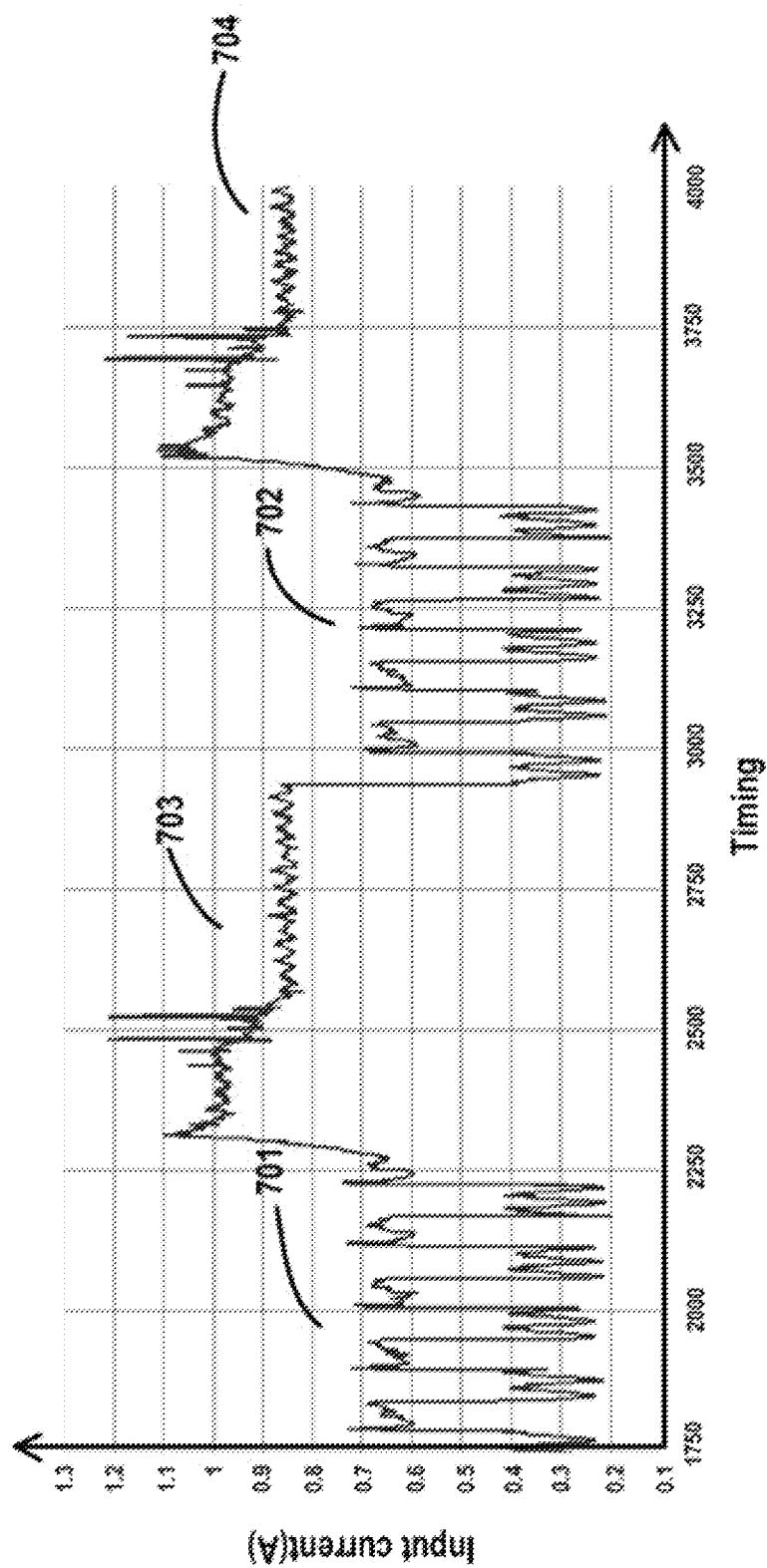
FIG. 7 shows a comparison of input currents obtained at a corresponding power port when the device changes power loading in a predetermined pattern and when the device operates normally.

FIG. 7 shows a comparison of input currents obtained at the power port 1 when the device 101 changes the power loading in a predetermined pattern (i.e., "10101010") and when the device 101 works normally. As shown in FIG. 7, each of curves 701 and 702 represents an input current obtained at the power port 1 when the device 101 changes the power loading in the predetermined pattern "10101010", wherein the time interval T is 10 seconds; and each of curves 703 and 704 represents an input current obtained at the power port 1 when the device 101 works normally. As seen from FIG. 7, when the device 101 changes the power loading in the predetermined pattern "10101010", square wave signals will be detected at the power port 1, as shown by curves 701 and 702.

Furthermore, as described above, the power distribution unit 110 may detect the power loading of the device 101 at power port 1 via which power supply is provided for the device 101. Thus, in some embodiments, in response to detecting, at the power port 1, the power loading of the device 101 is changed in a predetermined pattern, the power distribution unit 110 may store, for example, in a local EEPROM, the IP address of the power distribution unit 110 and the IP address of BMC of the device 101 together with the serial number of a corresponding power port so that they are associated with one another. In addition, the power distribution unit 110 may further transmit the serial number "1" of the power port to the management device 120 along with the IP address of the power distribution unit 110 and the IP address of BMC of the device 101. Therefore, the management device 120 may further determine, based on the serial number "1" of the power port, which unit of the rack the device 101 is located in.

Moreover, the rack usually includes a plurality of (e.g., 42) units from top to bottom. In order to conveniently determine, based on the serial number of a power port, which unit of the rack the device is located in, mapping between the serial number of a power port and a unit of the rack may be built. For example, as shown in FIG. 1, units of the rack and power ports of PDU may be numbered in bottom-top and/or left-right order, and a device in a unit having the same number is electrically connected with a power port having the same number. Thereby, it may be determined more conveniently, based on the serial number of a power port, which unit of the rack the device is located in.

In addition, the management device 120 may store, in the cloud database at the data center, the IP address of the power distribution unit 110, the position identifier of the physical position of the power distribution unit 110, the IP address of BMC of the device 101, and the serial number of a corresponding power port so that they are associated with one another, as shown in Table 1 below.

TABLE 1

| PDU IP | Physical Position of PDU | BMC IP | Serial number of Power Port |
|---|---|---|---|
| 10.243.65.15 | Hop-171-B2-F3-Lab4-Rack5 | 10.243.65.11 | 1 |

Figure 8:
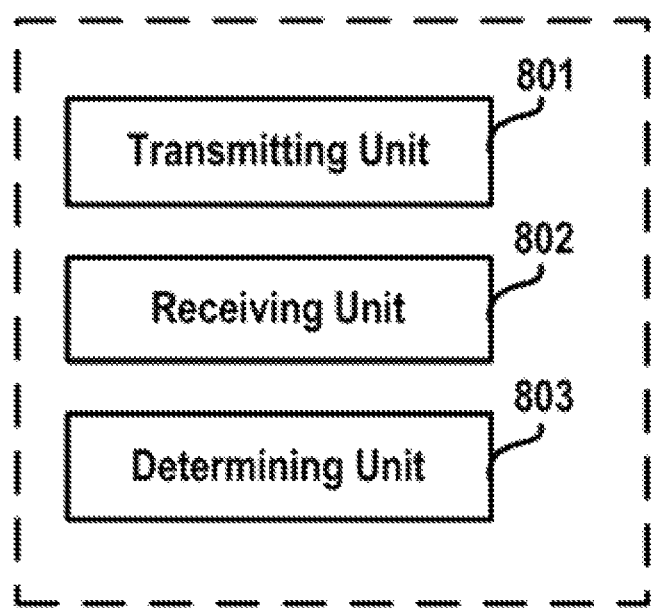
FIG. 8 shows a block diagram of an apparatus, implemented at a management device, for determining a physical position of device according to a fourth aspect of the embodiments of the present disclosure.

FIG. 8 shows a block diagram of an apparatus 800 for determining a physical position of a device according to a fourth aspect of the embodiments of the present disclosure. In some embodiments, apparatus 800 is implemented by the management device 120 shown in FIG. 1. However, it should be understood that apparatus 800 may also be implemented by other appropriate device. The scope of the present disclosure is not limited in this regard.

As shown in FIG. 8, the apparatus 800 comprises: a transmitting unit 801 configured to transmit a control command to the device instructing the device to change power loading of the device in a predetermined pattern; a receiving unit 802 configured to receive, from a power distribution unit providing power supply for the device, a network address of the power distribution unit, the network address being transmitted by the power distribution unit in response to detecting the power loading is changed in the predetermined pattern; and a determining unit 803 configured to determine the physical position of the device based at least on the network address of the power distribution unit.

In some embodiments, the control command includes a binary coding sequence indicating the predetermined pattern.

In some embodiments, a digit "0" in the binary coding sequence indicates the device to be in a first loading state in a predetermined time interval, and a digit "1" in the binary coding sequence indicates the device to be in a second loading state that is different from the first loading state in the predetermined time interval.

In some embodiments, the binary coding sequence is generated by encoding the network address of the device or an identifier specific to the device.

In some embodiments, the determining unit 803 is further configured to: determine a physical position of the power distribution unit based on mapping between the network address of the power distribution unit and the physical position of the power distribution unit; and determine the physical position of the power distribution unit as the physical position of the device.

In some embodiments, the receiving unit 802 is further configured to receive the network address of the power distribution unit, and a serial number of a power port of the power distribution unit which provides power supply for the device; and the determining unit 803 is further configured to determine the physical position of the device based on the network address of the power distribution unit and the serial number of the power port.

Figure 9:
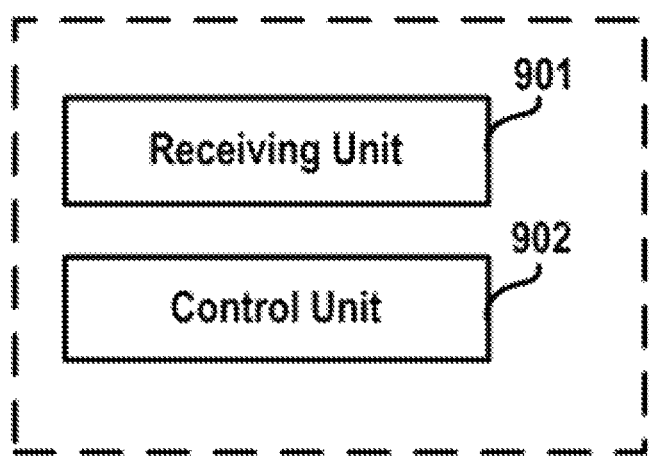
FIG. 9 shows a block diagram of an apparatus, implemented at a to-be-located device, for determining a physical position of a device according to a fifth aspect of the embodiments of the present disclosure.

FIG. 9 shows a block diagram of an apparatus 900 for determining a physical position of a device according to a fifth aspect of the embodiments of the present disclosure. In some embodiments, the apparatus 900 is implemented by any of devices 101 to 105 shown in FIG. 1. However, it should be understood that the apparatus 900 may also be implemented by other appropriate device. The scope of the present disclosure is not limited in this regard.

As shown in FIG. 9, the apparatus 900 comprises: a receiving unit 901 configured to receive, at the device, a control command instructing the device to change power loading of the device in a predetermined pattern; and a control unit 902 configured to change, based on the control command, the power loading of the device in the predetermined pattern so that the physical position of the device is determined by detecting the predetermined pattern.

In some embodiments, the receiving unit 901 and control unit 902 are implemented in a BMC of the apparatus 900.

Figure 10:
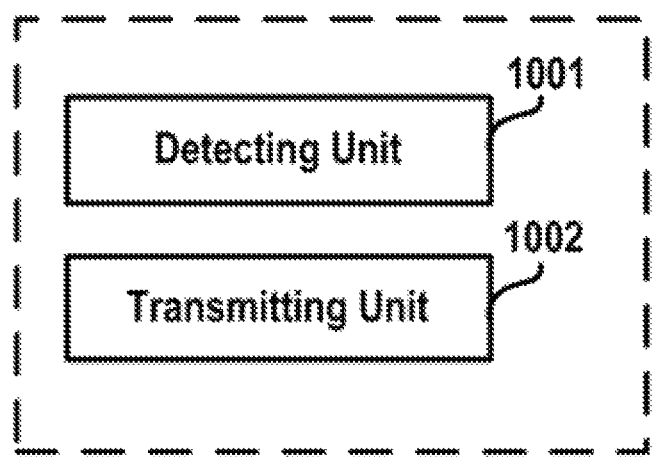
FIG. 10 shows a block diagram of an apparatus, implemented at a power distribution unit, for determining a physical position of a device according to a sixth aspect of the embodiments of the present disclosure.

FIG. 10 shows a block diagram of an apparatus 1000 for determining a physical position of a device according to a sixth aspect of the embodiments of the present disclosure. In some embodiments, the apparatus 1000 is implemented by the power distribution unit 110 shown in FIG. 1. However, it should be understood that the apparatus 1000 may also be implemented by other appropriate device. The scope of the present disclosure is not limited in this regard.

As shown in FIG. 10, the apparatus 1000 comprises: a detecting unit 1001 configured to detect power loading of the device at a power distribution unit that provides power supply for the device; and a transmitting unit 1002 configured to transmit, in response to detecting the power loading of the device is changed in a predetermined pattern, a network address of the power distribution unit to a management device so that the management device determines a physical position of the device based at least on the network address.

In some embodiments, the apparatus 1000 further comprises: a sampling unit configured to sample the power loading of the device so as to obtain sampled data; and a decoding unit configured to decode the sampled data so as to obtain a binary sequence, wherein a digit "0" in the binary sequence indicates the device to be in a first loading state in a predetermined time interval, and a digit "1" in the binary sequence indicates the device to be in a second loading state that is different from the first loading state in the predetermined time interval.

In some embodiments, the transmitting unit 1002 is further configured to transmit the network address of the power distribution unit and a serial number of a power port of the power distribution unit which provides power supply for the device so that the management device determines the physical position of the device based on the network address of the power distribution unit and the serial number of the power port.

Figure 11:
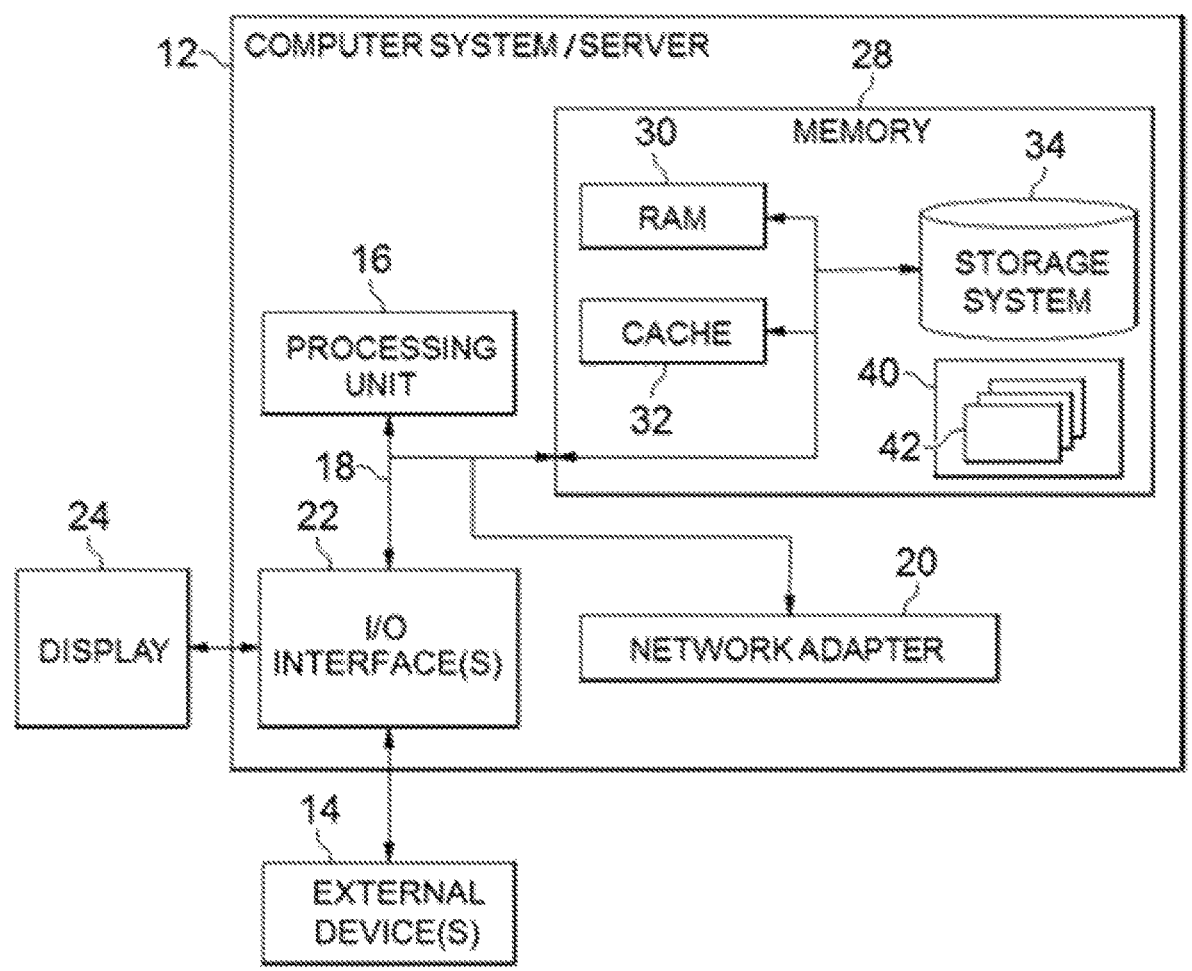
FIG. 11 shows a block diagram of an exemplary computer system/server which is applicable to implement the embodiments of the present disclosure.

FIG. 11 shows a block diagram of an exemplary computer system/server 12 which is applicable to implement the embodiments of the present disclosure. Computer system/server 12 shown in FIG. 11 is only illustrative and is not intended to suggest any limitation as to the scope of use or functionality of embodiments of the disclosure described herein.

As shown in FIG. 11, computer system/server 12 is shown in the form of a general-purpose computing device. The components of computer system/server 12 may include, but are not limited to, one or more processors or processing units 16, a system memory 28, and a bus 18 that couples various system components (including system memory 28 and processor 16).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In particular, according to the embodiments of the present disclosure, the processes as described above with reference to FIGS. 2-4 may be implemented as computer software programs. For example, the embodiments of the present disclosure include a computer program product, which includes a computer program tangibly embodied on the machine-readable medium. The computer program includes program codes for performing methods 200, 300 and 400.

Generally, various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing device. When various aspects of the embodiments of the present disclosure are illustrated or described into block diagrams, flow charts, or other graphical representations, it would be understood that the blocks, apparatus, system, technique or method described here may be implemented, as non-restrictive examples, in hardware, software, firmware, dedicated circuit or logic, common hardware or controller or other computing device, or some combinations thereof.

Besides, each block in the flowchart may be regarded as a method step and/or an operation generated by operating computer program code, and/or understood as a plurality of coupled logic circuit elements performing relevant functions. For example, the embodiments of the present disclosure include a computer program product that includes a computer program tangibly embodied on a machine-readable medium, which computer program includes program code configured to implement the method described above.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

The computer program code for implementing the method of the present disclosure may be written with one or more programming languages. These computer program codes may be provided to a general-purpose computer, a dedicated computer or a processor of other programmable data processing apparatus, such that when the program codes are executed by the computer or other programmable data processing apparatus, the functions/operations prescribed in the flowchart and/or block diagram are caused to be implemented. The program code may be executed completely on a computer, partially on a computer, partially on a computer as an independent software packet and partially on a remote computer, or completely on a remote computer or server.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any disclosure or claims, but should be explained as a description for a particular embodiment of a particular disclosure. In the present specification, some features described in the context of separate embodiments may also be integrated into a single embodiment. On the contrary, various features described in the context of a single embodiment may also be separately implemented in a plurality of embodiments or in any suitable sub-group.

Various amendments and alterations to the exemplary embodiments of the present disclosure as above described would become apparent to a person skilled in the relevant art when viewing the above description in connection with the drawings. Any and all amendments still fall within the scope of the non-limiting exemplary embodiments of the present disclosure. Besides, the above description and drawings offer an advantage of teaching, such that technicians relating to the technical field of these embodiments of the present disclosure would envisage other embodiments of the present disclosure as expounded here.

It would be appreciated that the embodiments of the present disclosure are not limited to the specific embodiments as disclosed, and the amendments and other embodiments should all be included within the appended claims. Although particular terms are used herein, they are used only in their general and descriptive sense, rather than for the purpose of limiting.

We claim:

1. A method of determining a physical position of a rack device located within a set of racks, each rack supporting one or more power distribution units and one or more rack devices, the method comprising:
    transmitting from a management device a control command to the rack device, the command instructing the rack device to change a power loading of the rack device in a periodic, repetitive pattern, the management device being constructed and arranged to communicate with each of the one or more power distribution units and the one or more rack devices supported on each rack;
    receiving at the management device, from a power distribution unit that provides power supply for the rack device, a network address of the power distribution unit, the network address being transmitted by the power distribution unit in response to detecting the change of the power loading in the periodic, repetitive pattern on a power port in which the rack device changes between a first operating state that increases the power loading to a first predetermined value and a second operating state that decreases the power loading to a second predetermined value that is different from the first operating state to provide the periodic, repetitive pattern on the power port; and
    determining at the management device the physical position of the rack device based at least on the network address of the power distribution unit;
    wherein the power loading of the rack device, when changing in the periodic, repetitive pattern, provides a particular binary coding sequence.

2. The method according to claim 1, wherein the control command includes the particular binary coding sequence; and wherein the particular binary coding sequence has a limited time duration.

3. The method according to claim 2, wherein a digit "0" in the particular binary coding sequence indicates the rack device to be in the first operating state in a predetermined time interval, and a digit "1" in the binary coding sequence indicates the rack device to be in the second operating state that is different from the first operating state in the predetermined time interval.

4. The method according to claim 3, wherein the particular binary coding sequence is generated by encoding a network address of the rack device or an identifier specific to the rack device.

5. The method according to claim 1, wherein determining the physical position of the rack device comprises:
    determining a physical position of the power distribution unit based on mapping between the network address of the power distribution unit and a physical position of the power distribution unit; and
    determining the physical position of the power distribution unit as the physical position of the rack device.

6. The method according to claim 5, wherein receiving the network address of the power distribution unit comprises receiving the network address of the power distribution unit and a serial number of the power port; and
    determining the physical position of the rack device comprises determining the physical position of the rack device based on the network address of the power distribution unit and the serial number of the power port.

7. The method according to claim 1, wherein transmitting the control command includes:
    sending the particular binary coding sequence to the rack device as part of the control command.

8. The method according to claim 1 wherein the power distribution unit includes multiple power ports; and
    wherein the method further comprises:
    receiving, in a transmission from the power distribution unit, a serial number that identifies the power port among the multiple power ports of the power distribution unit.

9. The method according to claim 8 wherein the network address of the power distribution unit and the serial number of the power port are both received at the management device in response to detecting the change of the power loading in the periodic, repetitive pattern to enable the management device to determine the physical position of the rack device based on the network address of the power distribution unit and the serial number of the power port.

10. The method according to claim 1, wherein transmitting the control command to the rack device includes:
    instructing the rack device to transition to the first operating state during a first time interval and to the second operating state during a second time interval to form at least a portion of the periodic, repetitive pattern, the power distribution unit being constructed and arranged to detect the portion of the periodic, repetitive pattern as a set of square wave signals.

11. A method of determining a physical position of a rack device located within a set of racks, each rack supporting one or more power distribution units and one or more rack devices, the method comprising:
    detecting at a power distribution unit that provides power supply for the rack device, power loading of the rack device; and
    in response to detecting the power loading of the rack device being changed in a periodic, repetitive pattern on a power port in which the rack device changes between a first operating state that increases the power loading to a first predetermined value and a second operating state that decreases the power loading to a second predetermined value that is different from the first operating state to provide the periodic, repetitive pattern on the power port, the power distribution unit transmitting a network address of the power distribution unit to a management device so that the management device determines the physical position of the rack device based at least on the network address, the management device being constructed and arranged to communicate with each of the one or more power distribution units and the one or more rack devices supported on each rack;

wherein the power loading of the rack device, when changing in the periodic, repetitive pattern, provides a particular binary coding sequence.

12. The method according to claim 11, wherein detecting the power loading of the rack device comprises:
sampling the power loading of the rack device to obtain sampled data; and
decoding the sampled data to obtain particular binary coding sequence,
wherein a digit "0" in the binary sequence indicates the rack device to be in the first operating state in a predetermined time interval, and a digit "1" in the binary sequence indicates the rack device to be in the second operating state that is different from the first operating state in the predetermined time interval.

13. The method according to claim 11, wherein transmitting the network address of the power distribution unit to the management device comprises:
transmitting the network address of the power distribution unit and a serial number of the power port so that the management device determines the physical position of the device based on the network address of the power distribution unit and the serial number of the power port.

14. The method according to claim 11, wherein prior to detecting the power loading of the rack device being changed in the periodic, repetitive pattern, the management device sends the particular binary coding sequence to the rack device as part of a control command.

15. An apparatus of determining a physical position of a rack device located within a set of racks, each rack supporting one or more power distribution units and one or more rack devices, the apparatus comprising:
a transmitting circuit within a management device, the management device being a processor configured to transmit a control command to the rack device, the command instructing the rack device to change power loading of the rack device in a periodic, repetitive pattern, the management device being constructed and arranged to communicate with each of the one or more power distribution units and the one or more rack devices supported on each rack;
a receiving circuit within the management device configured to receive, from a power distribution unit that provides power supply for the rack device, a network address of the power distribution unit, the network address being transmitted by the power distribution unit in response to detecting the change of the power loading in the periodic, repetitive pattern on a power port in which the rack device changes between a first operating state that increases the power loading to a first predetermined value and a second operating state that decreases the power loading to a second predetermined value that is different from the first operating state to provide the periodic, repetitive pattern on the power port; and
a determining circuit within the management device configured to determine the physical position of the device based at least on the network address of the power distribution unit;
wherein the power loading of the rack device, when changing in the periodic, repetitive pattern, provides a particular binary coding sequence.

16. The apparatus according to claim 15, wherein the control command includes the particular binary coding sequence.

17. The apparatus according to claim 16, wherein a digit "0" in the particular binary coding sequence indicates the rack device to be in first operating state in a predetermined time interval, and a digit "1" in the binary coding sequence indicates the rack device to be in second operating state that is different from the first operating state in the predetermined time interval.

18. The apparatus according to claim 15, wherein the determining circuit is further configured to:
determine a physical position of the power distribution unit based on mapping between the network address of the power distribution unit and the physical position of the power distribution unit; and
determine the physical position of the power distribution unit as the physical position of the rack device.

19. The apparatus according to claim 18, wherein the receiving circuit is further configured to receive the network address of the power distribution unit and a serial number of the power port; and
wherein the determining circuit is further configured to determine the physical position of the rack device based on the network address of the power distribution unit and the serial number of the power port.

20. The apparatus according to claim 15 wherein the transmitting circuit, when instructing the rack device to change power loading of the device in the periodic, repetitive pattern, is constructed and arranged to:
sending the particular binary coding sequence to the rack device as part of the control command.

* * * * *